US008814398B2

(12) United States Patent
Kang et al.

(10) Patent No.: US 8,814,398 B2
(45) Date of Patent: Aug. 26, 2014

(54) OPTICAL SEMICONDUCTOR BASED ILLUMINATING APPARATUS

(75) Inventors: Seok-Jin Kang, Seongnam-si (KR); Yoon-Gil Jang, Seongnam-si (KR); Su-Woon Lee, Seongnam-si (KR); Dong-Hee Kim, Seongnam-si (KR); Min-A Jeong, Seongnam-si (KR)

(73) Assignee: Posco LED Company Ltd., Seongnam-si (KR)

( * ) Notice: Subject to any disclaimer, the term of this patent is extended or adjusted under 35 U.S.C. 154(b) by 0 days.

(21) Appl. No.: 13/536,401

(22) Filed: Jun. 28, 2012

(65) Prior Publication Data

US 2013/0003362 A1 Jan. 3, 2013

(30) Foreign Application Priority Data

Jul. 1, 2011 (KR) ........................ 20-2011-0005995
Nov. 9, 2011 (KR) ........................ 10-2011-0116432
Dec. 12, 2011 (KR) ........................ 10-2011-0133126
May 15, 2012 (KR) ........................ 10-2012-0051464

(51) Int. Cl.

| | |
|---|---|
| ***B60Q 1/06*** | (2006.01) |
| ***F21V 29/00*** | (2006.01) |
| ***F21V 21/30*** | (2006.01) |
| ***F21S 8/04*** | (2006.01) |
| ***F21S 8/06*** | (2006.01) |
| ***F21V 15/01*** | (2006.01) |
| ***F21V 23/02*** | (2006.01) |
| ***F21V 21/34*** | (2006.01) |
| ***F21V 17/00*** | (2006.01) |
| *F21Y 105/00* | (2006.01) |
| *F21Y 101/02* | (2006.01) |
| *F21V 15/04* | (2006.01) |

(52) U.S. Cl.

CPC ................. *F21S 8/043* (2013.01); *F21V 21/30* (2013.01); *F21Y 2105/001* (2013.01); *F21Y 2101/02* (2013.01); *F21S 8/063* (2013.01); *F21V 29/2293* (2013.01); *F21V 15/011* (2013.01); *F21V 29/2212* (2013.01); *F21V 29/262* (2013.01); *F21V 23/023* (2013.01); *F21Y 2105/008* (2013.01); *F21V 21/34* (2013.01); *F21V 15/04* (2013.01); *F21V 23/026* (2013.01); *F21V 17/002* (2013.01)

USPC ............................ 362/373; 362/185; 362/294

(58) Field of Classification Search

USPC .......................................... 362/157, 184–185

See application file for complete search history.

(56) References Cited

U.S. PATENT DOCUMENTS 7,429,118 B1 * 9/2008 Borowiak ..................... 362/194
8,262,255 B1 * 9/2012 Rashidi .................... 362/249.02

(Continued)

FOREIGN PATENT DOCUMENTS

JP 2001-313482 11/2001
JP 2009-054499 3/2009

(Continued)

OTHER PUBLICATIONS

International Search Report for Application No. PCT/KR2012/004986 dated Dec. 20, 2012.

*Primary Examiner* — Donald Raleigh

(74) *Attorney, Agent, or Firm* — H.C. Park & Associates, PLC

(57) ABSTRACT

An optical semiconductor based illuminating apparatus including a housing having an opening portion, a lighting unit disposed adjacent to the housing that includes at least one optical semiconductor, a power supply mounted within the housing that supplies power to the lighting unit, and a gate unit connected to the opening part that opens and shuts the inner housing.

16 Claims, 20 Drawing Sheets

(56) References Cited

U.S. PATENT DOCUMENTS

| | | | | |
|---|---|---|---|---|
| 2010/0014289 | A1* | 1/2010 | Thomas et al. | 362/235 |
| 2010/0157602 | A1 | 6/2010 | Nichols | |
| 2010/0254122 | A1* | 10/2010 | Bayat et al. | 362/187 |
| 2010/0309671 | A1* | 12/2010 | Meyer et al. | 362/373 |
| 2011/0228523 | A1* | 9/2011 | Zheng | 362/184 |

FOREIGN PATENT DOCUMENTS

| | | |
|---|---|---|
| JP | 2009-164448 | 7/2009 |
| JP | 2010-033846 | 2/2010 |
| JP | 2010-287581 | 12/2010 |
| JP | 2011-228253 | 11/2011 |
| KR | 20-0275487 | 5/2002 |
| KR | 10-0934723 | 12/2009 |
| KR | 10-0989486 | 4/2010 |
| KR | 10-0973331 | 7/2010 |
| KR | 10-2010-0103267 | 9/2010 |
| KR | 10-2010-0115904 | 10/2010 |
| KR | 20-2011-0000533 | 1/2011 |
| KR | 10-2011-0049620 | 5/2011 |
| KR | 10-1034301 | 5/2011 |
| KR | 10-2011-0101936 | 9/2011 |
| KR | 10-2012-0020797 | 3/2012 |

* cited by examiner

OPTICAL SEMICONDUCTOR BASED ILLUMINATING APPARATUS

CROSS REFERENCE TO RELATED APPLICATIONS

This application claims priority from and the benefit of Korean Utility Model Application No. 20-2011-0005995, filed on Jul. 1, 2011, Korean Patent Application No. 10-2011-0116432, filed on Nov. 9, 2011, Korean Patent Application No. 10-2011-0133126, filed on Dec. 12, 2011 and Korean Patent Application No. 10-2012-0051464, filed on May 15, 2012, all of which are incorporated herein by reference for all purposes as if fully set forth herein.

BACKGROUND

1. Field

The present invention relates to an optical semiconductor based illuminating apparatus. More particularly, the invention relates to an optical semiconductor illuminating is apparatus having a gate unit for replacing a power supply efficiently.

2. Discussion of the Background

Generally, an illuminating apparatus is installed in a ceiling and used for indoor lamps in a home or office, or in an industrial workplace. When the power supply that is mounted inside the illuminating apparatus needs to be replaced due to damage or wearing out, the illuminating apparatus is removed from the ceiling and disassembled to replace the power supply. After replacing the power supply, the illuminating apparatus is reassembled and reinstalled to the ceiling. These steps consume a lot of time and effort and may cause inconvenience to users. In addition, when the ceiling is high, a device such as a ladder is required to reach the illuminating apparatus.

Therefore, in order to replace the power support efficiently, it is required to reach the power supply easily.

In another example, the illuminating apparatus is fixed to a ceiling or a structure by a device, such as a bracket. Usually, the bracket is fixed directly to a housing by a fastener, such as a bolt or nut. However, as the fastener is the only device fixed with the bracket, so that the bracket may not operate properly due to the weight of the housing.

Therefore, in order to hold the bracket with the housing without malfunction, it is required to have an additional supporting device.

In another example, an illuminating apparatus has a heat sink to dissipate the heat created by a power supply or a semiconductor device. The heat sink may be formed inside a housing, in which a suitable layout-structure is necessary considering the power supply.

Therefore, it is required to have a layout-structure allowing the heat sink and the power supply to coexist.

In another example, an illuminating apparatus has a heat sink to dissipate the heat created by a power supply or a semiconductor device. Using natural convection circulation are an effective and an inexpensive way to dissipate the heat.

Therefore, using natural convection is an effective method to dissipate the heat.

SUMMARY

Exemplary embodiments of the present invention provide an optical semiconductor based illuminating apparatus capable of enhancing luminous efficiency, reflection efficiency, heat dissipation efficiency, etc., and reducing maintenance cost by preventing dust, foreign substances, etc., from penetrating into the optical semiconductor illuminating apparatus or sticking to a reflector, etc., of the optical semiconductor illuminating apparatus.

Additional features of the invention will be set forth in the description which follows, and in part will be apparent from the description, or may be learned by practice of the invention.

An exemplary embodiment of the present invention includes an optical semiconductor based illuminating apparatus including a housing having an opening portion, a lighting unit disposed adjacent to the housing that includes at least one optical semiconductor, a power supply mounted within the housing that supplies power to the lighting unit, and a gate unit connected to the opening part that opens and shuts the inner housing.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide an understanding of the invention constitute a part of this specification, illustrate exemplary embodiments of the invention, and together with the description serve to explain the principles of the invention, wherein.

DETAILED DESCRIPTION OF THE ILLUSTRATED EMBODIMENTS

Figure 1:
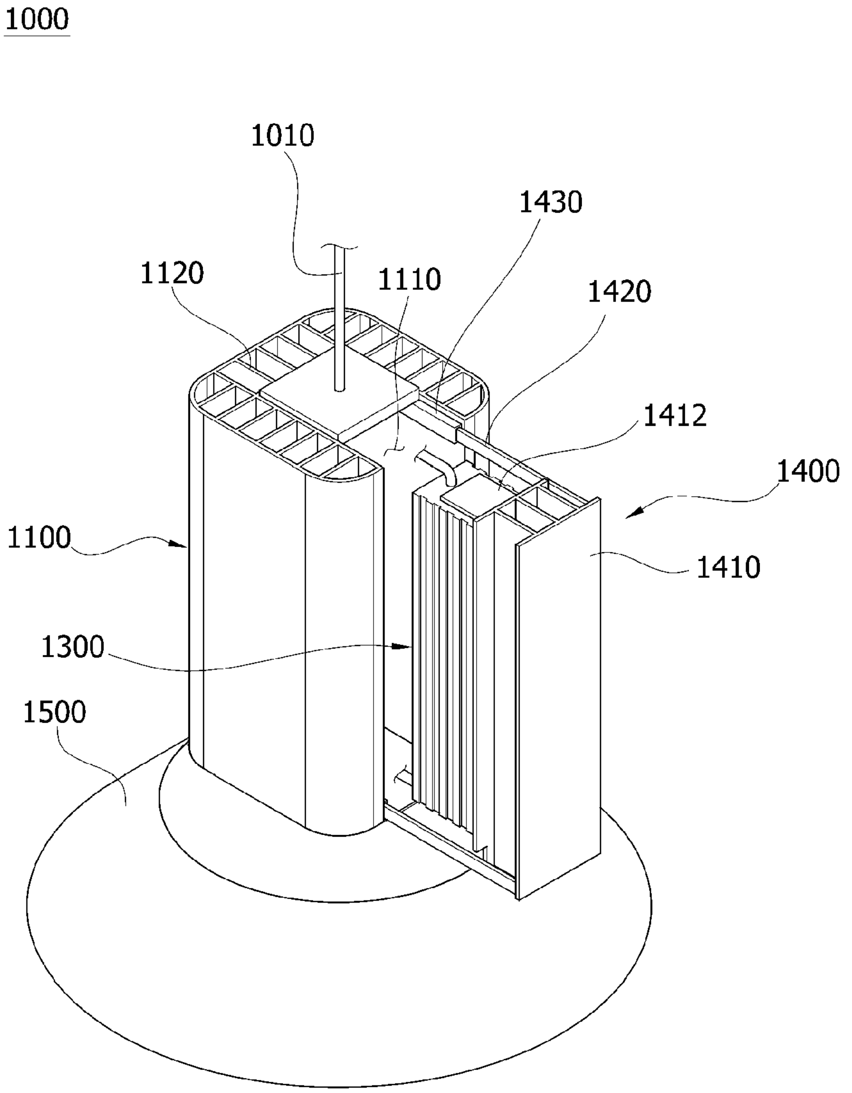
FIG. 1 is a top perspective view of an optical semiconductor based illuminating apparatus according to a first embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

As used in this application and claims the term "means" followed by a function is reference to the structure disclosed here as the exemplary embodiments of the invention and in addition to equivalent structures for performing the recited function and is not intended to be limited just to structural equivalents of the exemplary embodiments.

Figure 2:
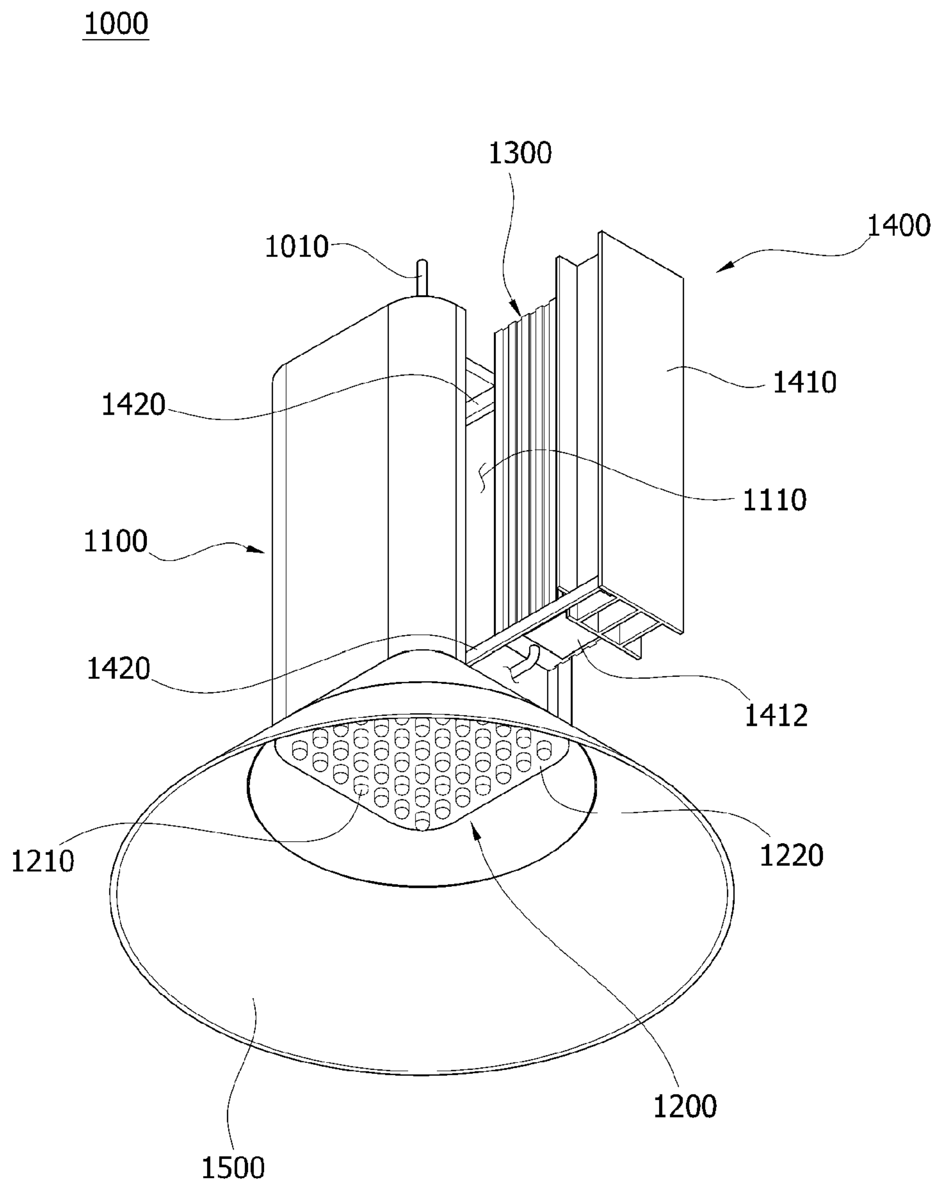
FIG. 2 is a bottom perspective view of an optical semiconductor based illuminating apparatus as illustrated in FIG. 1.

FIG. 1 is a top perspective view of an optical semiconductor based illuminating apparatus according to the first embodiment of the present invention. FIG. 2 is a bottom perspective view of an optical semiconductor based illuminating apparatus, as illustrated in FIG. 1.

Referring to FIGS. 1 and 2, an illuminating apparatus 1000 provides indoor illumination and is installed in a ceiling or a mounting structure (not shown in the drawing) disposed in a ceiling. A cord 1010 can be formed on the illuminating apparatus 1000 to lock with is the ceiling or the mounting structure.

The cord 1010 can be made up of a material to hold the illuminating apparatus 100 and be formed in a various shape such as a pipe, chain, wire. A power line (not shown in the drawing) is disposed in the cord 1010 to provide power to the illuminating apparatus 1000.

The illuminating apparatus 1000 includes a housing 1100, a lighting unit 1200 that emits light, a power supply that provides power to the lighting unit 1200, a gate unit 1400 that is connected to the housing 1100, and a reflector 1500 connected with the housing 1100 controlling the lightened area.

The housing 1100 is connected with one side of the cord 1010, for example, the housing 1100 can be connected by a screw. The inner housing 1100 may have a space and be formed by a highly thermal conductive material.

The housing 1100 includes an opening part 1110 that exposes the inner part of the housing 1100. The opening part 1110 is formed one side of the housing 1100. For example, the housing section can have a C-shape. The opening part 1110 has a space large enough to mount the power supply 1300 inside the inner part of the housing 1100.

According to the present embodiment, the housing 1100 can be a heat sink, which absorbs and releases the heat. The heat sink may be made of a material such as an aluminum having good thermal conduciveness to release the heat created in the inner heat sink.

The heat sink has a maximum surface area to facilitate heat dissipation. For example, the heat sink may have a porous structure. However, an outer side of the heat sink may have an outer case (not shown in the drawing) covering the heat sink portion.

The lighting unit 1200 disposed on one side of the housing 1100 emits light by receiving power from the power supply 1300. The lighting unit 1200 may include a planar is illuminating unit that emit light in a downwards direction. According to the present embodiment, the lighting unit 1200 can be formed by an edge-type planar illuminating unit or a direct-type planar illuminating unit. For example, the lighting unit 1200 may be a direct-type planar illuminating unit including a printed circuit board having a plural of semiconductor devices 1210. The semiconductor devices 1210 may include at least one of the following: a light emitting diode (LED), an organic light emitting diode (OLED), and an electro-luminescence device (EL). Moreover, the lighting unit may further include a diffusing plane (not shown in the drawing) that diffuses light emitted from the planar illuminating unit or a filter (not shown in the drawing) that transfers the emitting light with dim light.

The power supply 1300 can be stored inside the housing 1100. The power supply 1300 provides power to the lighting unit 1200. The power supply 1300 may convert the power applied by the cord to match with the voltage and the current used by the lighting unit 1200. For example, the power supply 1300 can be a SMPS (Switched-Mode Power Supply). The power unit 1300 may be connect-combined with the lighting unit 1200 to apply the power. The gate unit 1400 is disposed to be combined with the opening part 1110, for opening-and-shutting the inner part of the housing 1100.

The gate unit 1400 includes a base part 1410 that is connected with the opening part 1110 and a sliding rail part that is slidingly connected with the house 1100.

The base part 1410 and the opening part 1110 are formed to be the same size, so the base part 1410 can fit with the opening part 1110. The base part 1410 may be made of a material, such as an aluminum, having good thermal conductiveness like the heat sink, and having an identical structure with the heat sink.

The base part 1410 may further have a supporter 1412 that supports the power is unit 1300 on one side of the base part 1410. The supporter 1412 and the base part 1410 can be formed as one body, and the power supply 1330 can be fixed to the supporter 1412 by a connecting device, such as a connecting screw. In addition, the supporter 1412 can be formed as a pair, to correspond with the top and bottom part of the power supply, and one of the supporter 1412 can change its position considering the size of the power supply 1300.

The sliding rail part 1420 is connected with one side of the base part 1410. For example, the sliding rail part 1420 and the base part 1410 can be screw-connected or welding-combined. The sliding rail part 1420 can be formed as a pair considering the weight of the base part 1410.

Furthermore, the housing 1100 includes a rail receiving part 1430 sliding connecting with the sliding rail part 1420. The rail receiving part 1430 at one side of the housing 1100 is disposed at the corresponding location with the rail sliding part 1420. The inner part of the rail receiving part 1430 may have a space to take the rail sliding rail part 1420. The rail receiving part 1430 may include a locking-jaw (not shown in the drawing) to prevent the rail receiving part 1430 from slipping out. The inner part of the rail receiving part 1430 having a ball bearing (not shown in the drawing) letting the sliding rail part 1420 slide smoothly, or a lubricant applied or filled inside the rail receiving part 1430, to reduce frictional resistance.

The reflector 1500 is connected to one side of the housing 1100. In other words, the reflector 1500 is formed to cover the lighting unit 1200 and controls the lightened area emitted by the lighting unit 1200. In some cases, the reflector 1500 can be omitted.

According to the operating relationship of the illuminating apparatus 1000 as described above, the illuminating apparatus 1000 is connected to the ceiling or the mounting structure through the cord 1010. When there is a malfunction to the power supply 1300 in the is illuminating apparatus 1000, a worker uses a device, such as a ladder, to get close to the position of the installed illumination apparatus 1000. The worker that is close enough to the illuminating apparatus 1000 pulls out the base part 1410 of the gate unit 1400 with his/her hand. The sliding rail part 1420 slides with the rail receiving part 1430 installed in the housing 1100 and opens up the opening part 1110. When the sliding rail part 1420 is slid to a critical length, the locking-jaw formed in the rail receiving part 1430 holds the sliding rail part 1420 and prevents it from falling out. At this point, the worker removes the power supply 1300 that is mounted inside the base part 1410 or attached to the base part 1410, and replaces it with a new power supply 1300, thereby finishing the replacement work.

According to the present embodiment, the gate unit 1400 that is formed at one-side of the housing 1100 is provided to open-and-shut the interior of the housing. In other words, not having to dissemble the illuminating apparatus 100, the power supply 1330 can be easily exposed and replaced by pulling the base part 1410 of the gate unit 1400.

Figure 3:
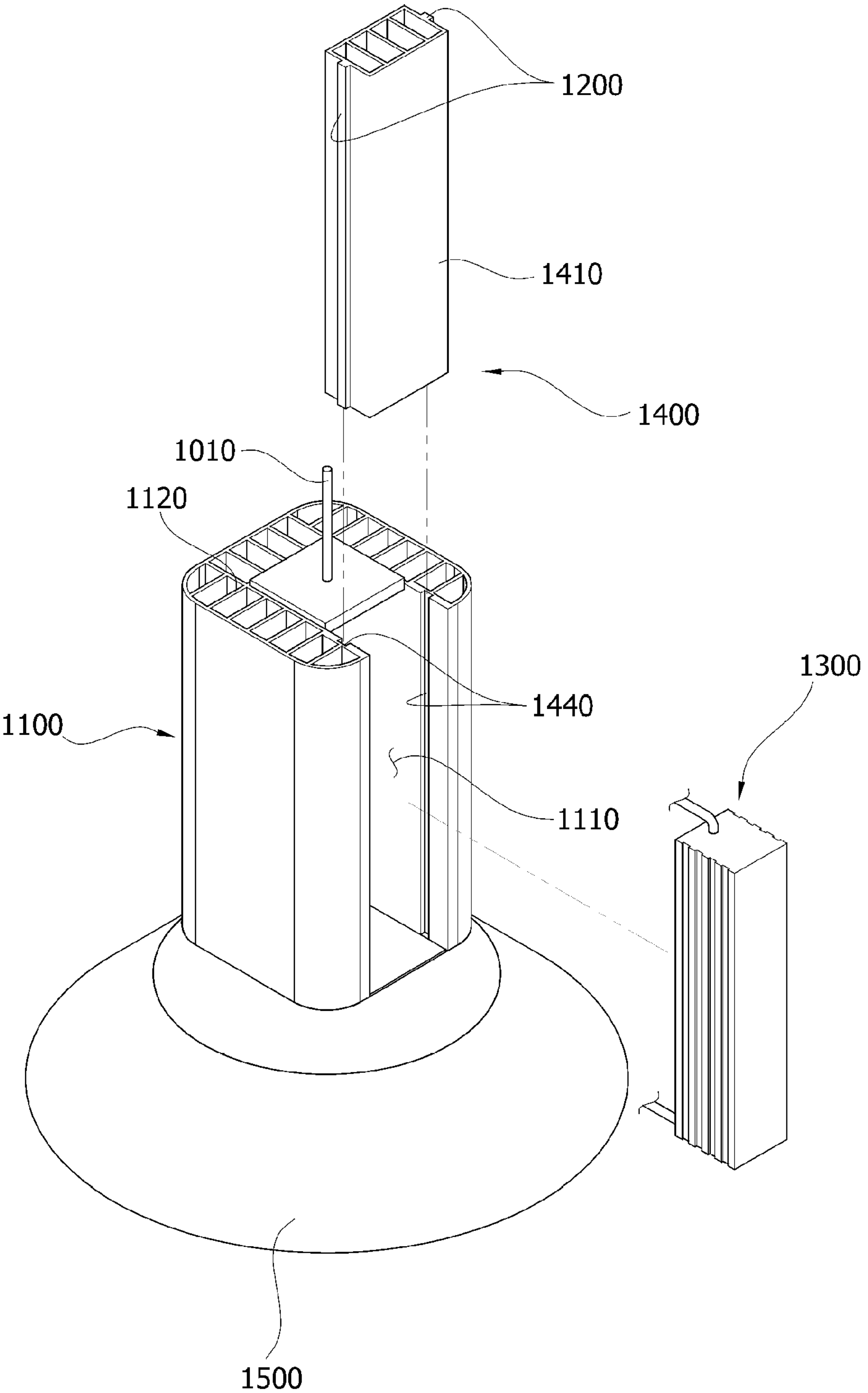
FIG. 3 is a perspective view explaining the connecting relationship between a housing and a gate unit in an optical semiconductor based illuminating apparatus according to a second embodiment of the present invention.

FIG. 3 is a perspective view explaining the connecting relationship between the housing and the gate unit in an optical semiconductor based illuminating apparatus according to the second embodiment of the present invention.

The embodiment of the present invention shown in FIG. 3 is substantially the same as the illuminating apparatus 1000 of Embodiment 1 described in FIGS. 1 to 2 except for a portion of the housing 1100 and the gate unit 1400. Thus, any further description for substantially the same elements as Embodiment 1 will be omitted, and the same reference numerals as Embodiment 1 will be given to substantially the same elements.

Referring to FIG. 3, according to the present embodiment, the housing 1100 has a pair of a first combining sections 1120 that are formed on both sides of the opening part 1110.

The first combining sections 1120 are formed to correspond with both sides of the opening parts 1110 of the housing 100. The first combining sections 1120 can each have a groove or projection with the critical length and can be formed from top to bottom of the opening part 1110. Furthermore, the first combining sections 1120 can be each formed on the outer surface of the opening part 1110 to maintain a space accommodating the power supply 1300 inside the housing 1100.

The gate unit 1400 can further include a base part 1410 that can be combined with the opening part 1110 and a pair of second combining sections 1400 that are formed on the base part 1410.

The second combining sections 1440 can be form at both sides of the base part 1410 to correspond with the first combining sections 1120, and are combined female-and-male with the first combining sections 1120 for sliding. The second combining sections 1440 may each have a groove or projection formed considering the first combining sections 1120 shape.

The first combining sections 1120 of the housing 1100 and the second combining sections 1440 of the base part 1410 are female-and-male combined to slide up-and-down, wherein a holding means is formed on at least one of the housing 1100 or the base part 1410, and holds the sliding to a critical length. On the contrary, a holding means can be formed on at least one of the first combining section 1120 and the second combining section 1440.

According to the operating relationship between the first combining section 1120 and the second combining section 1440 as described above, the illuminating apparatus 1000 is connected to the ceiling or the mounting structure through the cord 1010. When there is a malfunction of the power supply 1300 in the illuminating apparatus 1000, a worker uses a device such as a ladder to get close to the position of the installed illumination apparatus 1000. The is worker that is close enough to the illuminating apparatus 1000 grabs one side of the base part 1410 pulling it upward. When the upward pulled base part 1410 is slid at a critical height, it is fixed by the holding means. Therefore, when the base part 1410 is fixed, the worker can replace the power supply 1300 then grabs one side of the base part 1410, pulling it downward.

Figure 4:
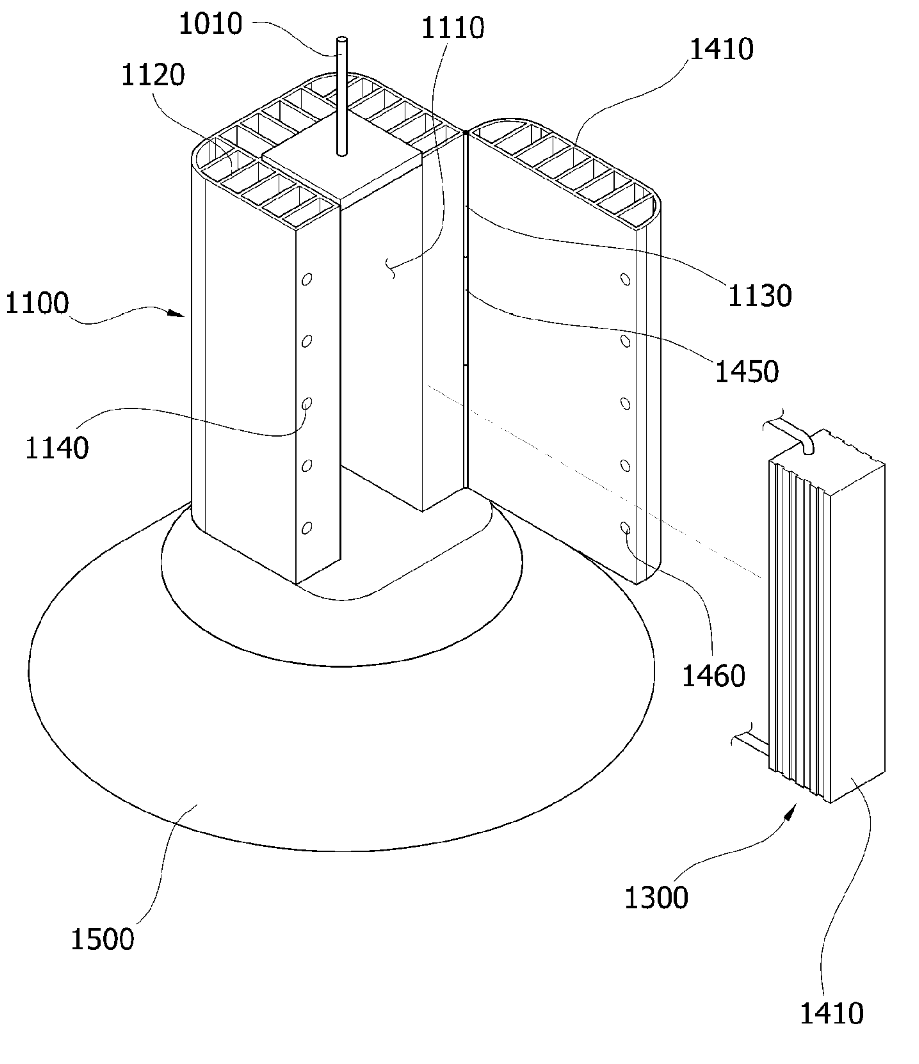
FIG. 4 is a perspective view explaining the connecting relationship between a housing and a gate unit in an optical semiconductor based illuminating apparatus according to a third embodiment of the present invention.

FIG. 4 is a perspective view to explain the connecting relationship between the housing and the gate unit in an optical semiconductor based illuminating apparatus according to the third embodiment of the present invention.

The embodiment of the present invention is substantially the same as the illuminating apparatus 1000 of Embodiment 1 described in FIGS. 1 to 2 except for a portion of the housing 1100 and the gate unit 1400. Thus, any further description for substantially the same elements as Embodiment 1 will be omitted, and the same reference numerals as Embodiment 1 will be given to substantially the same elements.

Referring to FIG. 4, according to the present embodiment, a first hinge section 1130 is formed one side of the housing 1100, and a first fixing section 1140 is formed to correspond with the other side of the housing 1100.

The first hinge section 1130 can be formed as one body with the housing 1100 or can be fixed with a fastening device (not shown in the drawing). A cylinder-shaped-through-hole can be formed inside the inner first hinge section 1130 to dispose a pivot pin (not shown in the drawing).

At least one first fixing section 1140 is disposed to the other side of the first hinge section 1130 based on the opening part 1110. The first fixing section 1140 can be formed as a fastening device such as a locking-jaw, a screw thread, or a magnet.

The gate unit 1400 includes a base part 1410 that is able to connect with the is opening part 1110, a second hinge section 1450 is formed at one side of the base part 1410 to correspond with the first hinge section 1130, and a second fixing section 1460 that is formed at one side of the base part 1410 to correspond with the first fixing section 1140. The second hinge section 1450 is formed at one side of base part to correspond with the first hinge section 1130. The second hinge section 1450 is through-connected with the first hinge section 1130 by a pivot pin (not shown in the drawing), in which the base part 1410 rotates based on the first hinge section 1130 and the second hinge section 1450. The second fixing section 1460 is a fastening device such as a locking-jaw, a screw thread, or a magnet, formed on one side of the base part 1410 to correspond with the first fixing section 1140. For example, the first fixing section 1140 and the second fixing section 1460 can be fixedly combined with each other by a magnet at the corresponding point.

According to the operating relationships between the first hinge section 1130 and the second hinge section 1450 and the first fixing section 1140 and the second fixing section, as described above, the illuminating apparatus 1000 is connected to the ceiling or the mounting structure through the cord 1010. When there is a malfunction to the power supply 1300 in the illuminating apparatus 1000, a worker uses a device, such as a ladder, to get close to the position of the installed illumination apparatus 1000. The worker that is close enough to the illuminating apparatus 1000 grabs one side of the base part 1410 then pulls it to an opposite side of the housing 1100. The first hinge section 1130 and the second hinge section 1450 are rotated about an axis to open the base part 1410, and the worker can replace the power supply 1300 that is inside the housing 1100, and fix the base part 1410 to the housing 1100 by pushing the opened base part 1410 to the housing 1100 direction connecting the first fixing section 1140 and the second fixing section 1460.

Figure 5:
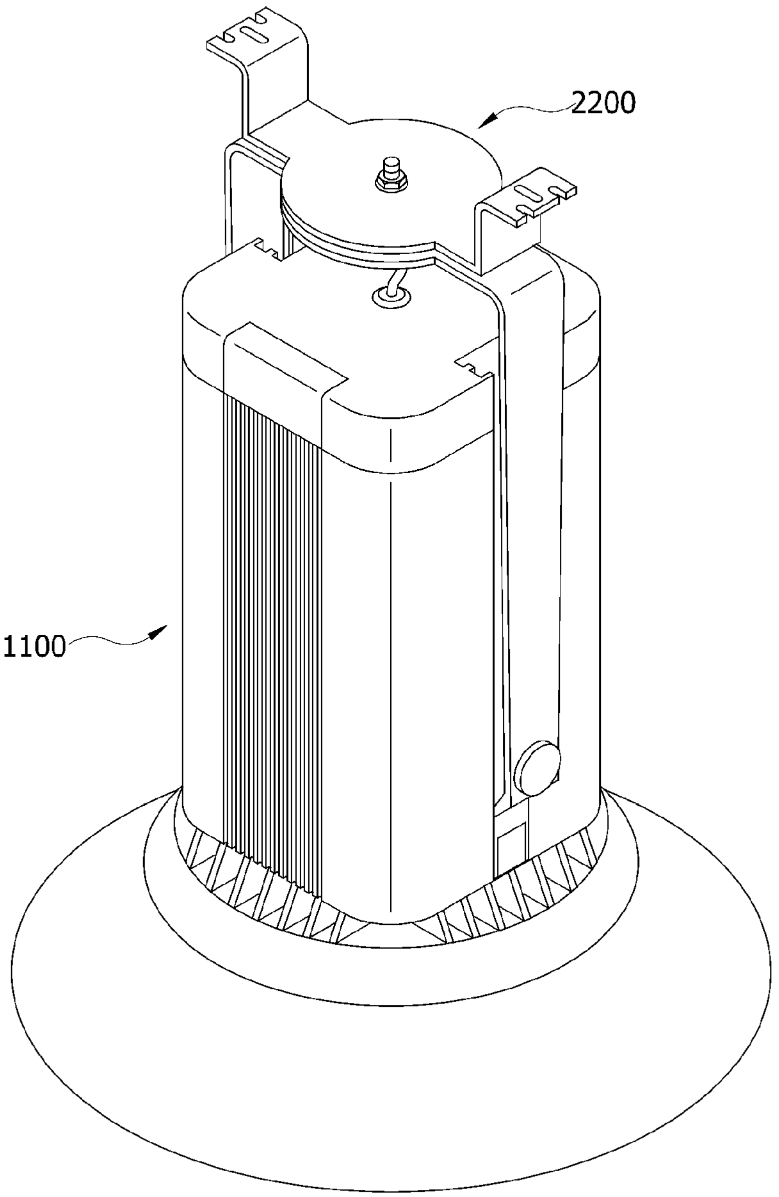
FIG. 5 is a perspective view showing the entire structure of an optical semiconductor based illuminating apparatus according to a fourth embodiment of the present invention.

FIG. 5 is a perspective view to show the entire structure of an optical semiconductor based illuminating apparatus according to the fourth embodiment of the present invention.

The present invention includes a housing 1100 having at least one optical semiconductor (not shown in the drawing), and a tilting unit 2200 which is fixed to an object and is connected with at least one side of the housing that allows to control the tilt angle of the housing 1100 on the object 1100.

Figure 6:
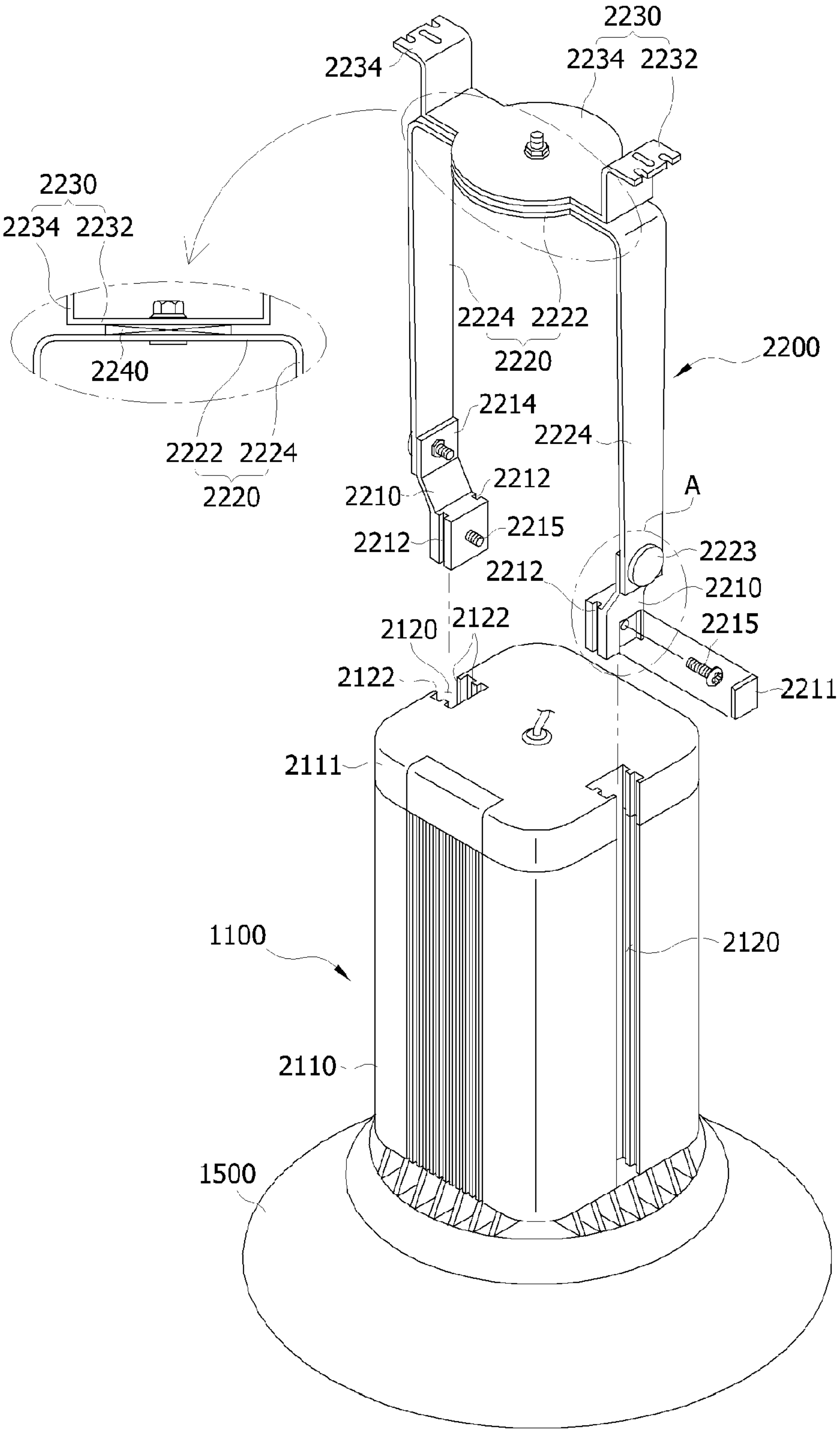
FIG. 6 is an exploded perspective view showing the entire structure of an optical semiconductor based illuminating apparatus according to a fourth embodiment of the present invention.
Figure 7:
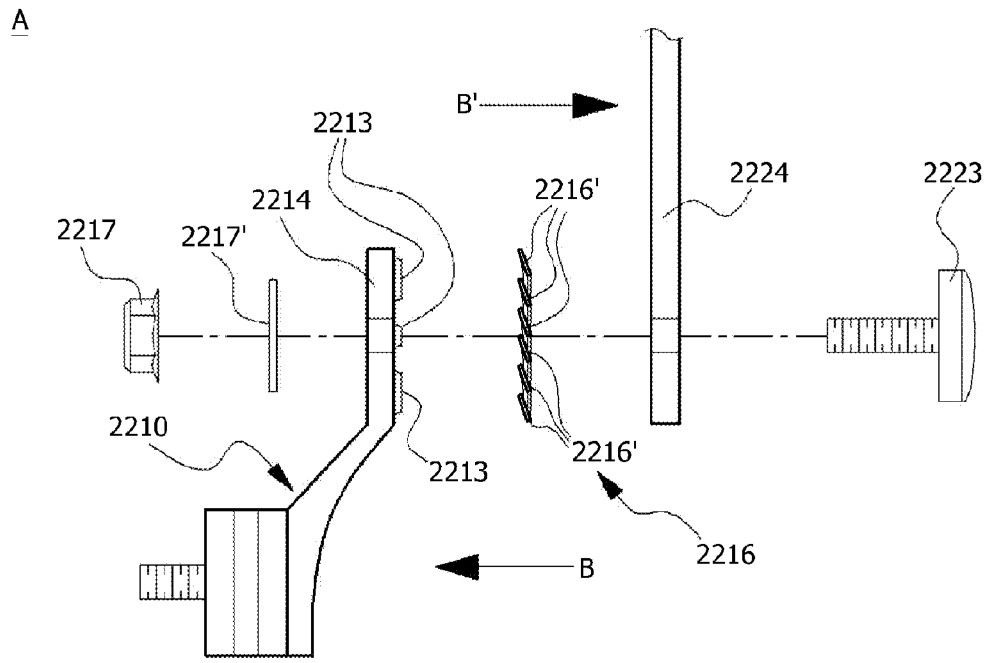
FIG. 7 and FIG. 8 are conceptual views showing the structure of a head and a bracket that is formed in a tilting unit which is a principal part of an optical semiconductor illuminating apparatus according to the fourth embodiment of the present invention.
Figure 8:
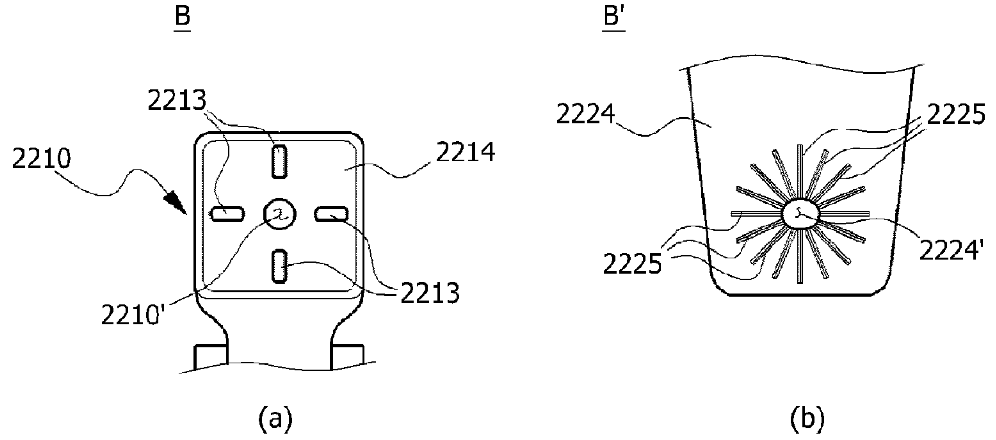

FIG. 6 is an exploded perspective view showing the entire structure of an optical semiconductor based illuminating apparatus according to the fourth embodiment of the present invention, and FIG. 7, FIG. 8 are conceptual views showing the structures of the head and the bracket of the tilting unit of an optical semiconductor illuminating apparatus according to the fourth embodiment of the present invention.

The housing 1100 having an optical semiconductor, provides a space to combine with the tilting unit 2200, and an outer case 2110 in which a reflector 1500 is formed on a lower portion.

A rail 2120 combined with the tilting unit 2200 forming longitudinally is depressed inwards on at least one outer surface of the outer case 2110.

The rail 2120 is used to adjust the combining position of the tilting unit 2200.

In other words, a worker can move the tilting unit 2200 along the formed direction of the rail 2120, and decide a suitable fixing position considering the size and location of the object.

When combining the opposite side of the rail 2120 with the tilting unit 2200, at least one protrusion jaw 2122 may be formed longitudinally along the rail 2120, having to is sustain a firm fastening state about the shearing stress between the housing 1100 and the tilting unit 2200.

Moreover, the tilting unit 220 combined with the housing 1100 can adjust the inclination angle of the housing, and is a structure having a head 2210 sliding connecting with the rail 2120 as shown in FIG. 6.

A first groove 2212 may be formed at the opposite side of the rail 2120 that corresponds with the protrusion jaw 2122 forming longitudinally along the rail 2120.

The head 2210 having a cover 2210 that can be detachable towards the outside, separating the cover 2211 from the head 2210 and combining it with a fixing tool such as a bolt, then closing the cover 2211.

The appearance is neat as the combining parts are not exposed.

The tilting unit 2200 is a structure further including a bracket 2220 connected to the object allowing the rotation of the housing 1110, that can be combined and rotated with the head 2210 through a fastener 2223 such as a bolt.

Furthermore, the tilting unit 2200 that is fixed to an object is a structure further including a fixing segment 2230 connected to the housing 1100 and the bracket 2220.

In other words, the bracket 2220 is a structure having a supporting segment 2224 that is extended at both side of the first connecting piece 2222 and allows the rotation of the head 2210.

The fixing segment 2230 can be combined with a second connecting piece 2234 of the fixing segment 2230 connected to the object.

When it is necessary that the supporting segment 2224 extended from the first connection piece 2222 of the bracket 2220 is to be installed slightly rotated, a worker may rotate the bracket 2220 using the second connecting piece as an axis, to fix the first connecting piece 2222 of the bracket 2220 and the second connecting piece 2234 of the fixing segment 2230, and combining it together.

The tilting unit 2200 can further include a buffering member 2240 that absorbs vibration between the fixing segment 2230 and the bracket 2220, to prevent a direct impact to the electronic devices inside the housing 1100 and the housing 1100 itself, by absorbing or dispersing the vibration created by the environment the housing 1100 is installed.

The buffering member 2240 can use an elastic rubber, a synthetic rubber, or a synthetic resin, and can be replaced with any structure or device that can absorb or disperse the impact like a flat spring or a coil spring.

The head 2210 may have a contact segment 2214 that rotates by moving close to the bracket 2220 as in FIGS. 7 and 8.

As described above, the contact segment 2214 further includes a fastener 2223 for interconnecting the bracket 2220 with a screw, in which the fastener 2223 allows the housing 1110 to rotate the bracket 2220, and holding them together.

The housing 1100 fixed to the bracket 2200 allowing the contact segment 2214 and the bracket 2220 to rotate, can change its emitted location and area, due to the high output illuminating apparatus which is a heavy equipment, such that the position of rotation means may be restricted.

As described above, the contact segment 2214 formed around the fastener 2223 has a plurality of projection segments 2213 that protrude at equal intervals along the edge of the connecting hole 2210' The projection segment 2213 can be locked with the washer 2216 between the bracket 2220 and the supporting segment 2224.

The washer 2216 that prevents untightening is formed by a plurality of radial twisted edges 2216' that correspond with both sides of the connecting hole 2210' of the connecting segment 2214 or the connecting hole 2224' of the supporting segment.

Therefore, the projection segment 2213 can be fixed between the adjacent twisted edges 2216', so that the connecting segment 2214 doesn't change the first inclined angle.

The end portion of the twisted edge 2216' is not shown in the drawing, can be formed in any shapes if it can be fixed to the rib groove 2215.

The supporting segment 2224 of the bracket 2220 has a plurality of comb-shaped rib grooves 2225 formed at equal intervals around the fastener 2223, The worker penetrates the fastener 2223 to the supporting segment 2224 and the contact segment 2214, mounting a washer 2216 between the contact segment 2214 and the supporting segment 2224, temporally fixing the washer 2217' or the nut 2217 to the end part of the fastener 2223, then sliding combing to fix the head 2210 to the rail 2120, thereby adjusting the angle of the housing 1100

In addition, the supporting segment may have a projection segment 2213 acting as a ratchet wheel to the fin (not shown), and the fin acting as a ratchet fin to prevent a reverse revolution.

Therefore, the present embodiment provides an optical semiconductor based illuminating apparatus that can sensitively control the height and adjusts the angle.

Figure 9:
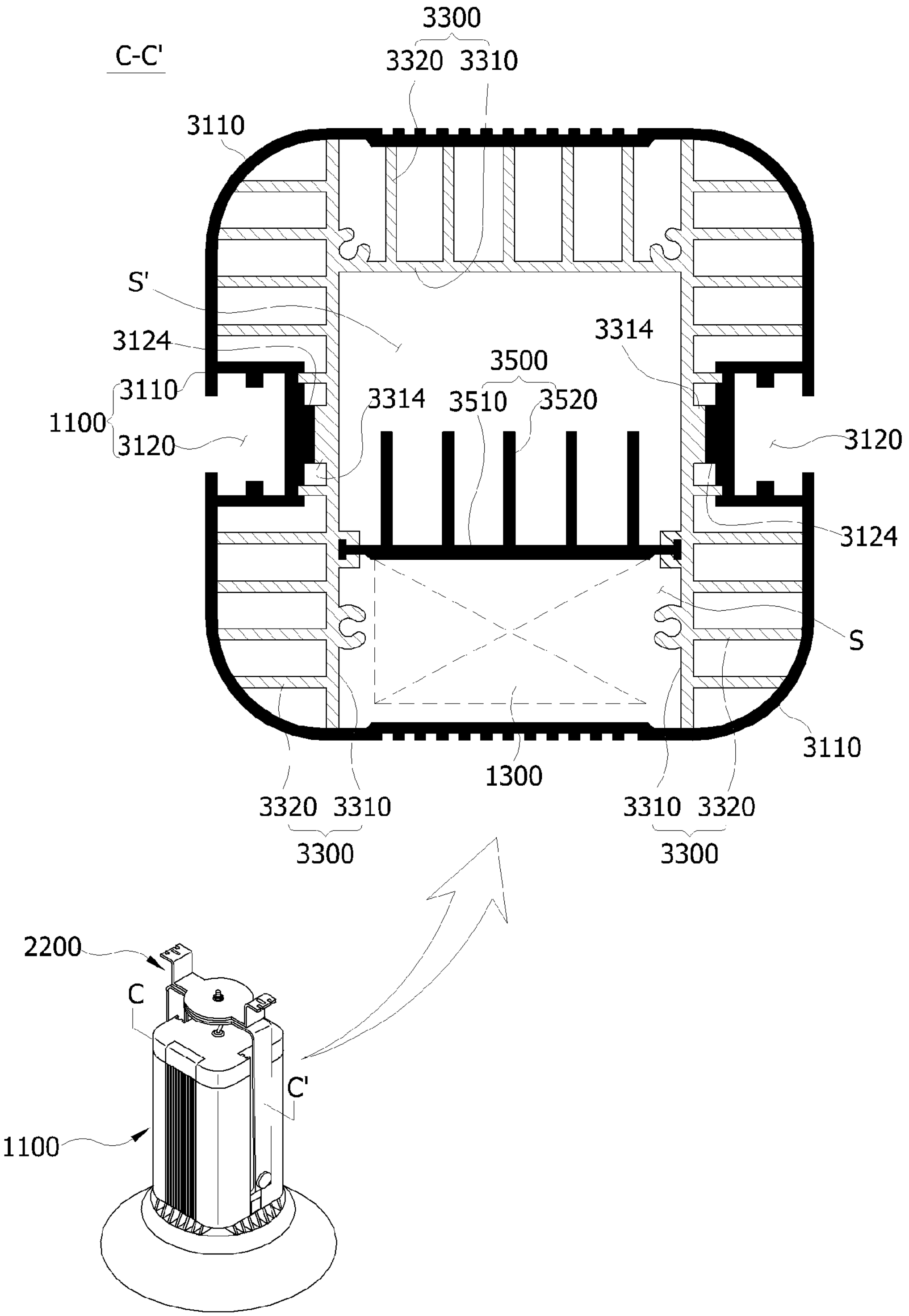
FIG. 9 is a conceptual view showing the entire structure of an optical semiconductor based illuminating apparatus according to a fifth embodiment of the present invention.
Figure 10:
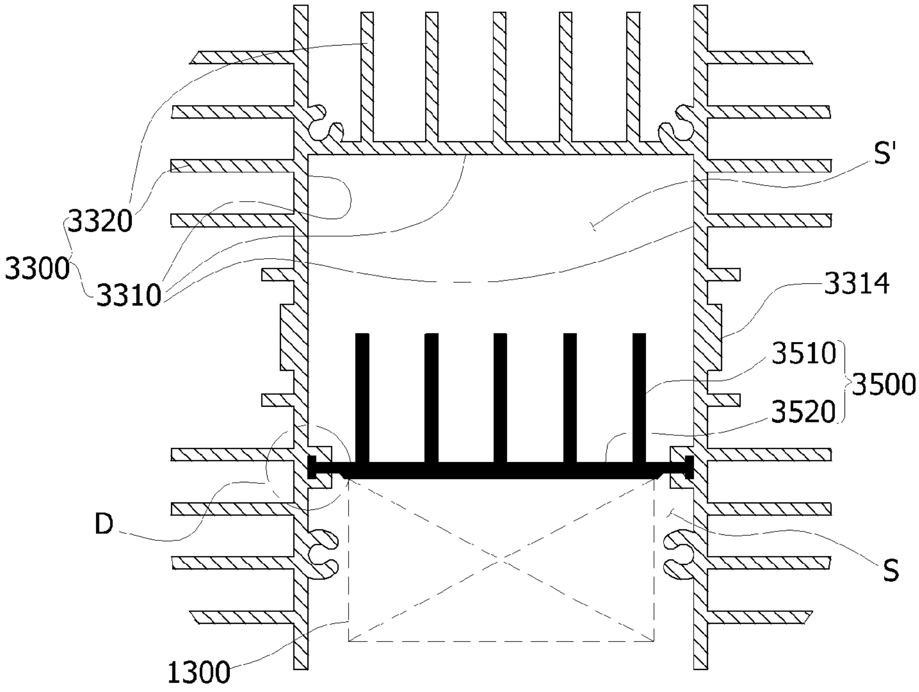
FIG. 10 is a conceptual view showing the structure of the heat sink of an optical semiconductor illuminating apparatus according to the fifth embodiment of the present invention.
Figure 11:
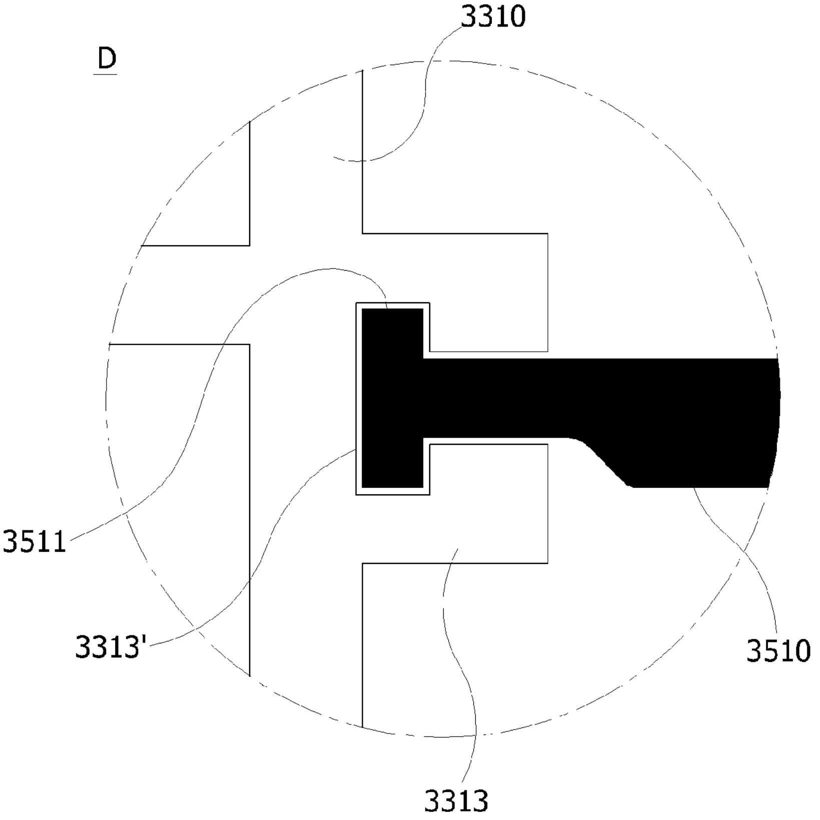
FIG. 11 is a partial magnified view of portion D in FIG. 10.
Figure 12:
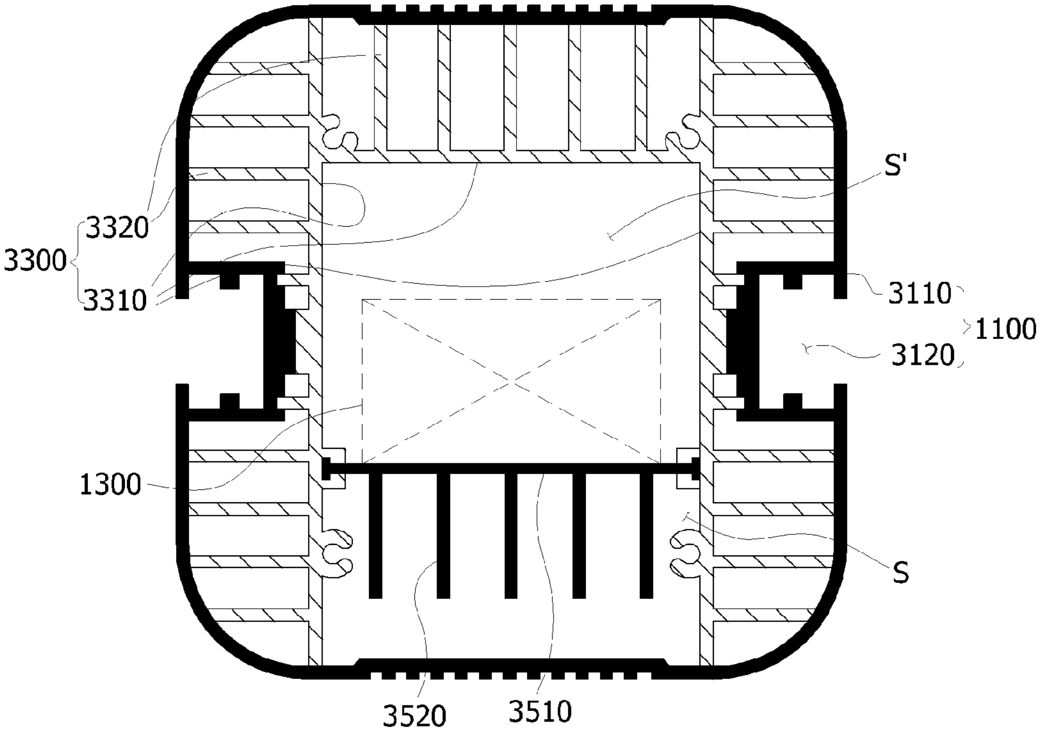
FIG. 12 is a conceptual view showing the state of an optical semiconductor illuminating apparatus according to a sixth embodiment of the present invention.

FIG. 9 is a conceptual view showing the entire structure of an optical semiconductor based illuminating apparatus according to the fifth embodiment of the present invention, FIG. 10 is a conceptual view showing the structure of the heat sink of an optical semiconductor illuminating apparatus according to the fifth embodiment of the present invention, FIG. 11 is a partially magnified view of portion D in FIG. 10, and FIG. 12 is a conceptual view showing the state of an optical semiconductor illuminating apparatus according to the sixth embodiment of the present invention.

Referring to the drawings, the present invention is a structure including a housing 1100 having at least one optical semiconductor (not shown in the drawing), a power supply (SMPS, Switched-Mode Power Supply) 1300 mounted inside the housing 1100, and a heat sink 3300 mounted adjacent to the inner part of the housing 1100.

Referring to FIG. 12, the power supply (SMPS) 1300 can be selectively mounted in the space (S) between the outer part of the heat sink 3300 and the inner part of the housing 1100 in FIG. 9, or in the inner space (S') of the heat sink 3300 that is formed by at least one face.

The present embodiment, for example, may be applied to the other previous embodiments.

The housing 1100 having an optical semiconductor device, a space provided to mount a heat sink 3300, and an outer case 2110 having the heat sink 3300 mounted in the outer case 2110.

A rail 3120 depressed inwards on at least one of the outer surfaces of the outer case 2110 that combines with a tilting unit 2200, is formed longitudinally.

The rail 3120 can adjust the joining position of the tilting unit 2200 which fixes to a structure such as a ceiling.

Therefore, the worker can move the tiling unit 2200 along the rail, deciding an appropriate position to fix, considering the structure and location of the object.

The heat sink 3300 can effectively exhaust the heat generated by the mounted semiconductor having a structure which a plurality of heat dissipating fin 3320 inwardly protruding to the inner-side of the outer case 2110, a plurality of heat dissipating plate 3310 facing the inner-side of the outer case 2110.

In other words, the heat sink 3300 has a plurality of heat dissipating fins 3320 formed inwardly toward the outer case 2110, and the plurality of heat dissipating fins 3320 are formed at the heat dissipating fin plate 3310 that faces the inner-side of the outer case 2110.

The heat dissipating fins 3320 can form as one body with the heat dissipating plate 3310, can fasten with the heat dissipating plate 3310 using a fastening member, or can combine with the inserting groove (not show in the drawing).

The heat sink 3300 can be used to dissipate the heat. In addition, it can also be connected to the outer case 2110 with the heat dissipating plate 3310, so that the protruded heat dissipating fins 3320 can maintain the structural strength inside the housing 1100.

The housing 1100 and the heat sink 3300 each have a first reinforcing projection piece 3124 and a second reinforcing projection piece 3314 to increase the structural strength.

Specifically, the first reinforcing projection piece 3124 protrudes inward the outer case 2110 that has a rail 3120 formed, and the second reinforcing projection piece 3314 protrudes from the heat sink 3300, i.e., heat dissipating plate 3310, connecting with the first reinforcing piece 3124.

The first and second reinforcing piece (3124, 3314) can be entirely protruded along the outer case 2110 in a longitudinal direction (up/down), and the protrusion intervals can be formed equally.

The structure of a heat dissipating member 3500 forming the auxiliary heat plate 3510 and the auxiliary heat fins 3520 can be applied to the embodiment, having a cutout area that is created at one side of the heat sink 3300 corresponding with the plurality of heat dissipating plate 3310, wherein the cutout area can slides with the auxiliary heat dissipating plate 3510 having the plurality of auxiliary heat dissipating fin 3520.

Therefore, the power supply 1300 can face towards the center of the inner housing 1100 mounted in the inner space (S') of the heat sink 3300, or can face towards the outer of the housing 1100 mounted in the space between the outer side of the heat sink 3300 and the inner side of the housing 1100.

To accomplish this, both ends of the auxiliary heat dissipating plate 3510 may have a locking projection jaw 3511, as shown in FIG. 11, wherein a second groove 3313' that corresponds with the shape of locking projection jaw 3511, slidingly connects with the projection jaw 3313, which is formed in a longitudinal direction (up/down) of the outer case 2110, can be applied to the embodiment.

Therefore, the auxiliary heat dissipating plate 3510 can mount the power supply (SMPS) 1300, as shown in the drawing, the power supply 1300 can be mounted to face the outer case 2110 as in FIG. 9, or the power supply 1300 can be mounted inside a space that is surrounded by the heat dissipating plate 3310.

The present embodiment maximizes the use of a space of a mounted device and increases the structural strength at the same time.

Figure 13:
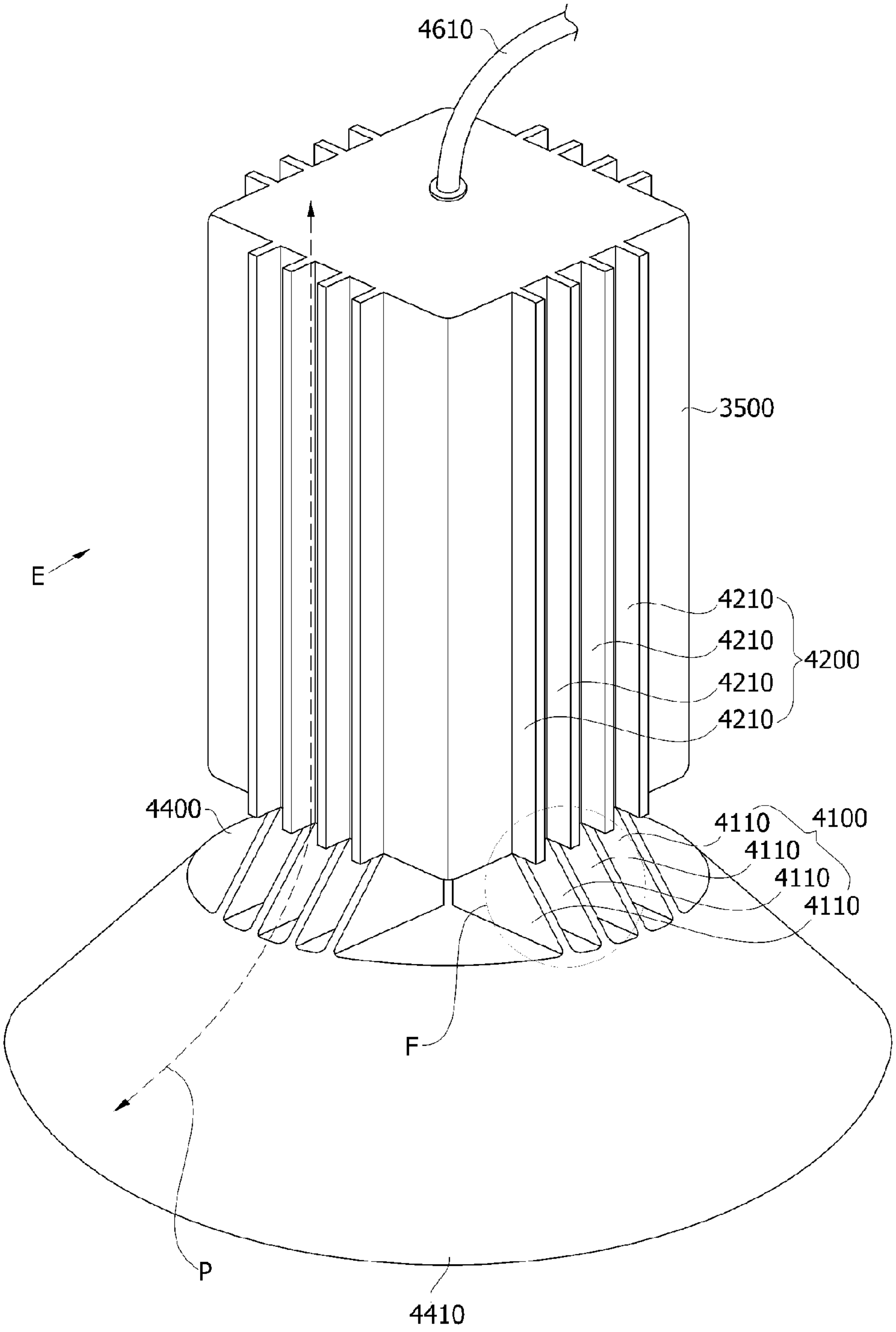
FIG. 13 is a perspective view showing the outer side of an optical semiconductor illuminating apparatus according to a seventh embodiment of the present invention.
Figure 14:
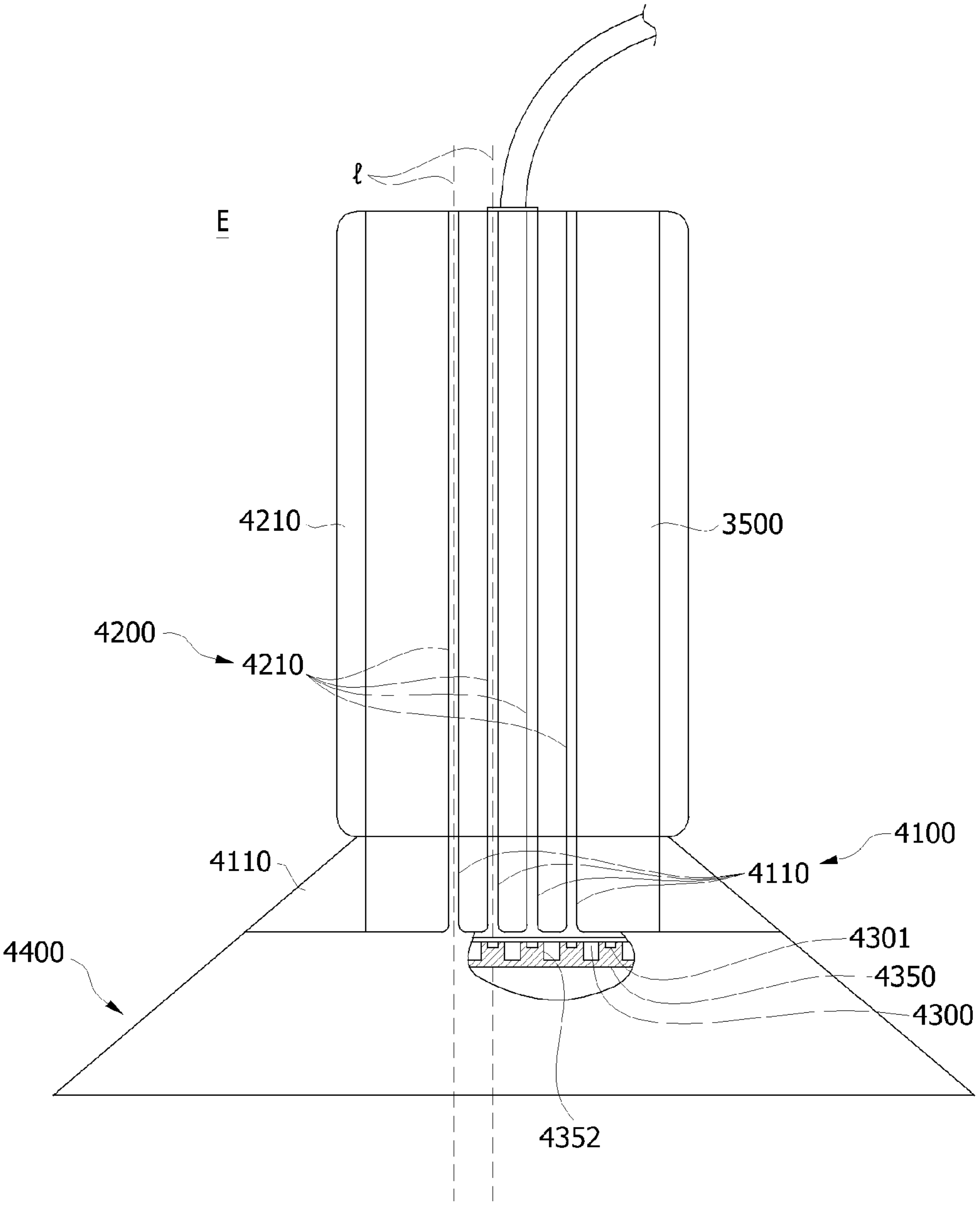
FIG. 14 is a perspective view, viewed from the viewpoint E in FIG. 13.

FIG. 13 is a perspective view showing the outer side of an optical semiconductor illuminating apparatus according to the seventh embodiment of the present invention, and FIG. 14 is a perspective view, viewed from the viewpoint E in FIG. 13.

The present invention includes a base 4400 having a lighting unit that equips a first heat sink 4100, and a heat dissipating member 3500 formed at the upper side of the base 4400 that equips a second heat sink 4200.

The unexplained drawing number of 4350 is a lighting member, 4352 is a lens, and 4600 is a cord connected with the power supply (SMPS) 1300.

For reference, a housing covering the outer side of the heat dissipating member 3500 is not shown in the drawing, for helping to understand the FIG. 13.

The lighting unit 1200 having at least one semiconductor device 1210 acting as a source of light.

The base 4400 is a member to form the lighting unit 1200, more specifically to provide a space for the lighting unit 1200.

The heat dissipating member 3500 is disposed on the upper side of the base 4400, and forms a space for various devices, such as a power supply.

The first heat sink 4100 is formed at the upper side of the outer base 4400, having a plurality of first heat dissipating fins 4110, to externally exhaust the heat generated by the lighting unit 1200.

The second heat sink 4200 is formed at an outer side of the heat dissipating member 3500, having a plurality of second heat dissipating fins 4210, to externally exhaust the heat generated by the various devices inside the lighting unit 1200 and the heat dissipating member 3500.

Therefore, the heat generated by the lighting unit 1200 and the heat dissipating member 3500 can be externally exhausted through the first heat sink 4100 and the second heat sink 4200, producing cooling effect.

The present embodiment, for example, may be applied to the other previous embodiments.

The first heat sink 4100 and the second heat sink 4200 are interconnected, as is shown in the drawing, and form an air moving path (P) inducing natural convection. The first heat dissipating fins 4110 and the second heat dissipating fins 4210 are disposed on a virtual first linear line (l).

The plurality virtual linear lines (l) may be disposed in parallel.

Moreover, the base 4400 having an open-bottom and gradually increasing along the downward direction, further includes a reflector 1500 that expands the light emitted from the semiconductor device 1210.

Figure 15:
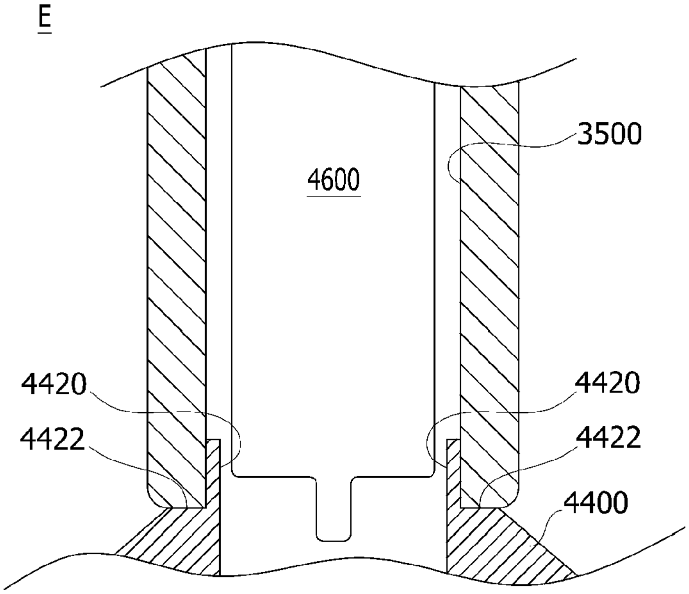
FIG. 15 is a partial section view, viewed from the viewpoint E in FIG. 13.

The base 4400 as in FIG. 15 protrudes upwards for harmoniously combination and is fixed with the heat dissipating member 3500, further including a connecting bulkhead 4420 that corresponds with the inner-side of the lower portion of the heat dissipating member 3500.

A thermal grease (not shown in the drawing) may be included between the inner-side of the lower portion of the heat dissipating member and the outer-side of the connecting bulkhead 4420.

Figure 16:
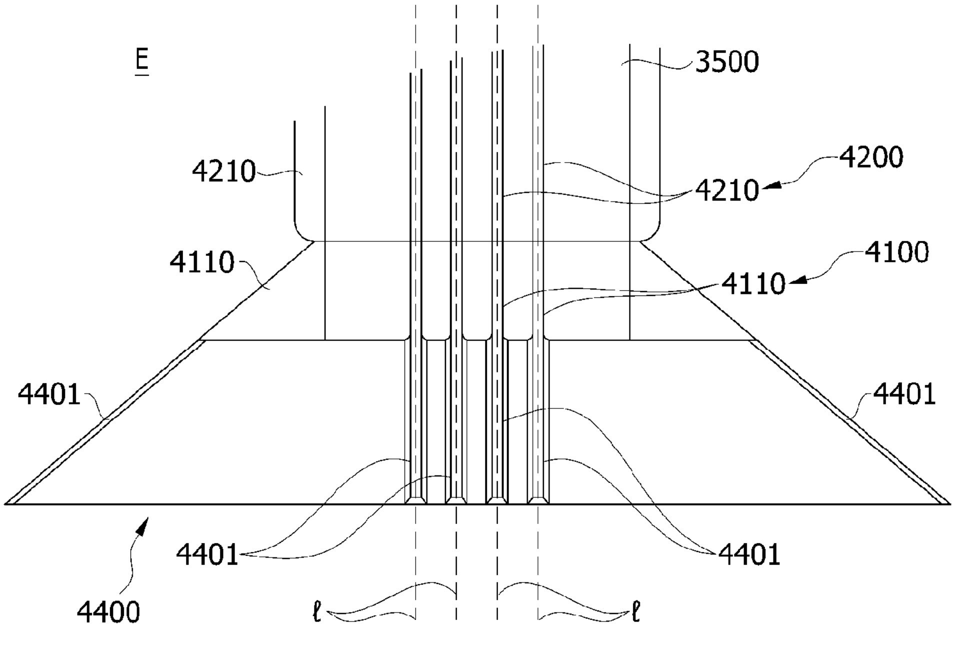
FIG. 16 and FIG. 17 are conceptual views showing the structure of the heat dissipating part of an optical semiconductor illuminating apparatus according to the eighth embodiment of the present invention.
Figure 17:
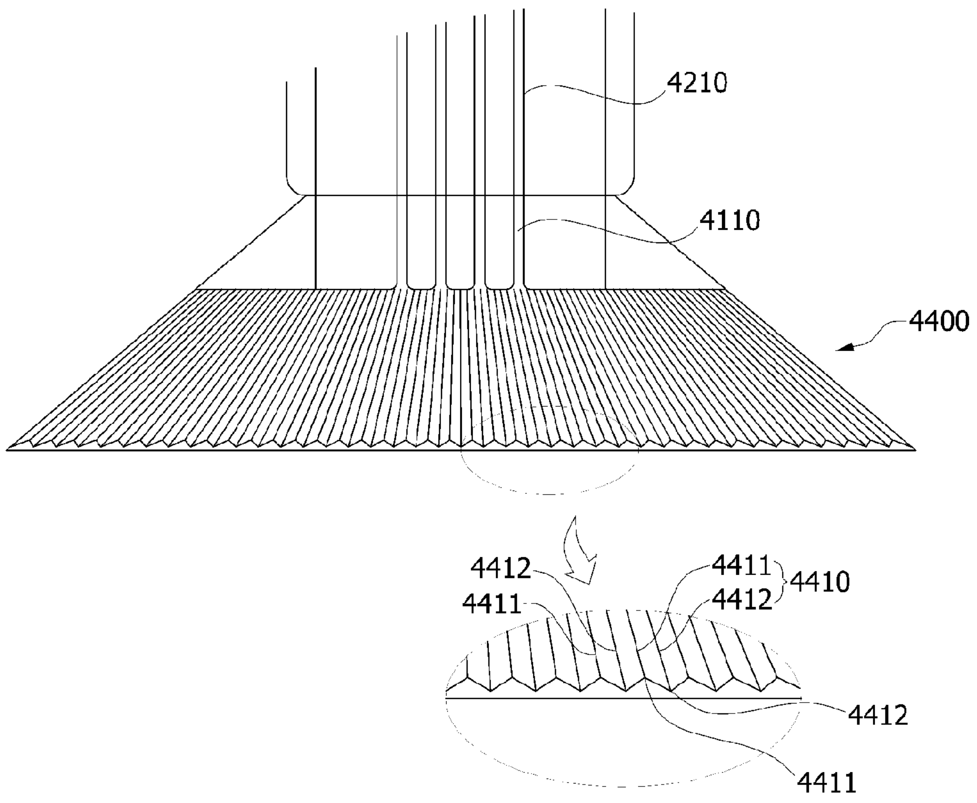

The base 400 with the first, second heat sink (4100, 4200), further includes a heat dissipating rib 4401, as shown in FIG. 16, that is formed at the virtual linear line(l) extended from an end part of the first heat dissipating member of the outer side of the base 4400, to activate the natural convection that surrounds the outer part of the entire device which is formed longitudinally along the apparatus.

The base 400 with the first, second heat sink (4100, 4200), can further include a heat dissipating part that is formed by extending the edge of the upper base 4400 to the lower edge forming a rib 4411 and groove 4412, to expand the heat dissipating area activating the natural convection that surrounds the outer part of the apparatus.

The first and second heat sinks (4100, 4200) are explained in more detail in FIGS. 18 thru 21.

Figure 18:
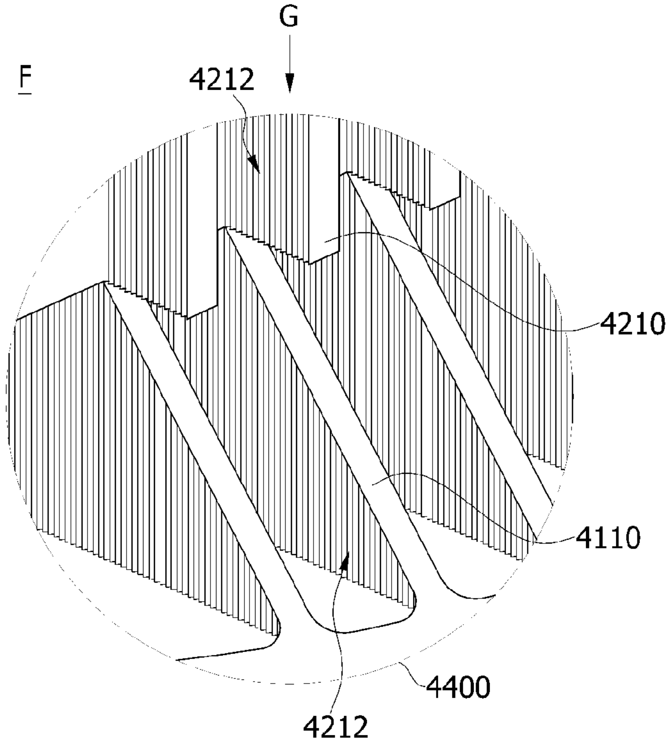
FIG. 18 and FIG. 20 are partial perspective views showing the shape of the first heat sink and the second heat sink of an optical semiconductor illuminating apparatus according to the various embodiments of the present invention.
Figure 19:
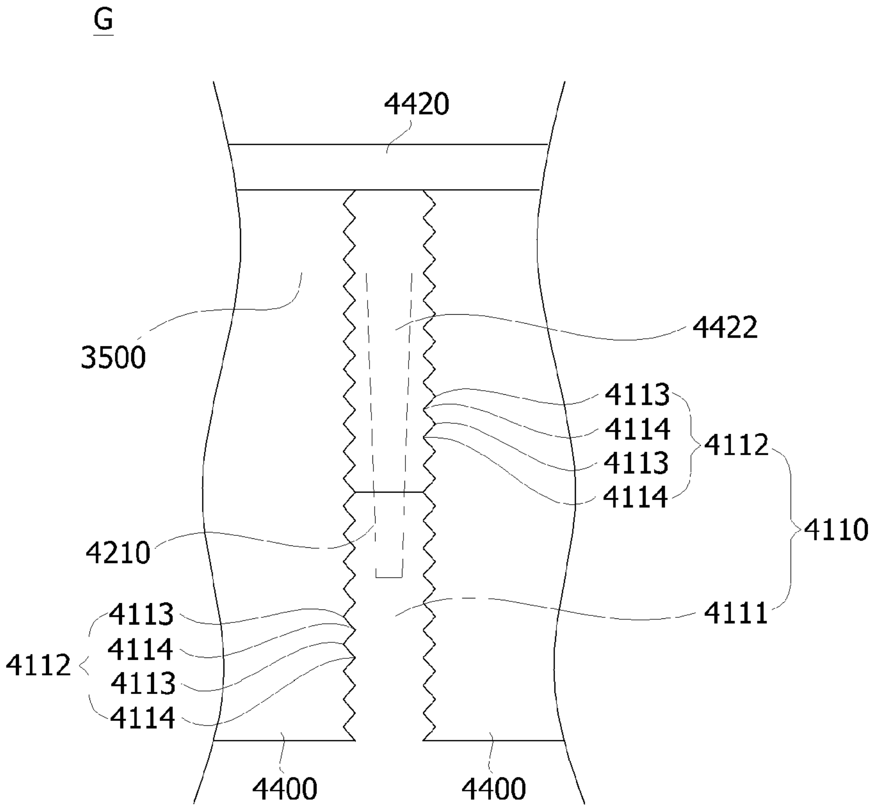
FIG. 19 and FIG. 21 are plan conceptual views, viewed from the viewpoint G in FIG. 18 and FIG. 20.

The first heat dissipating fins 4110 having the first heat sink 4100 further include a first pattern piece 4112 having a repeated rib 4113 and groove 4114 on at least one side of the plurality of the protruding first fin body 4111, more particularly, at both side of the first fin body 4111, to greatly increase the heat transfer area for heat dissipation effect, as shown in FIG. 18 and FIG. 19.

The formed direction of the first pattern piece 4112 may be parallel with the first heat dissipating fin 4110 that is formed along the air moving part (P, referring to FIG. 13) to activate natural convection.

Figure 20:
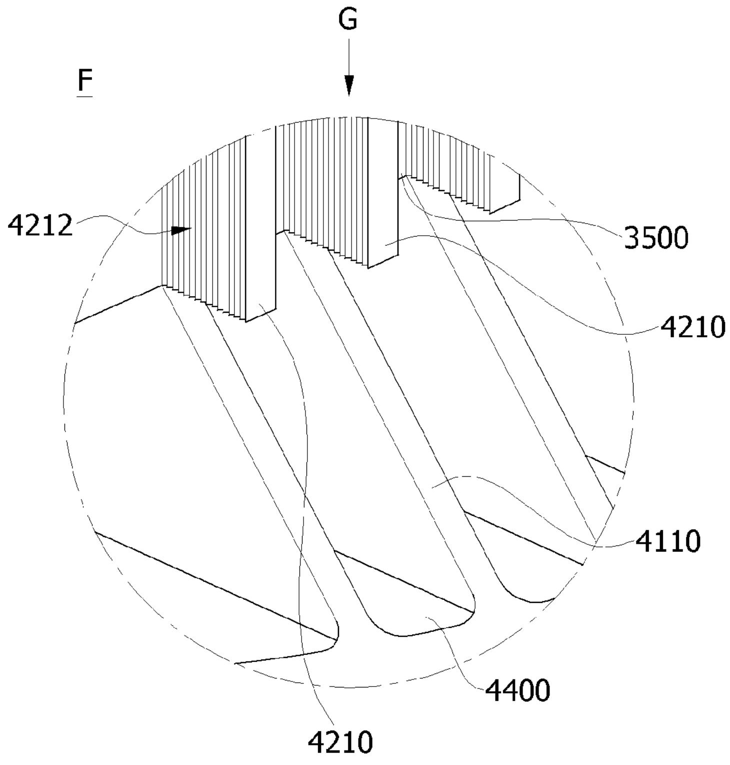
Figure 21:
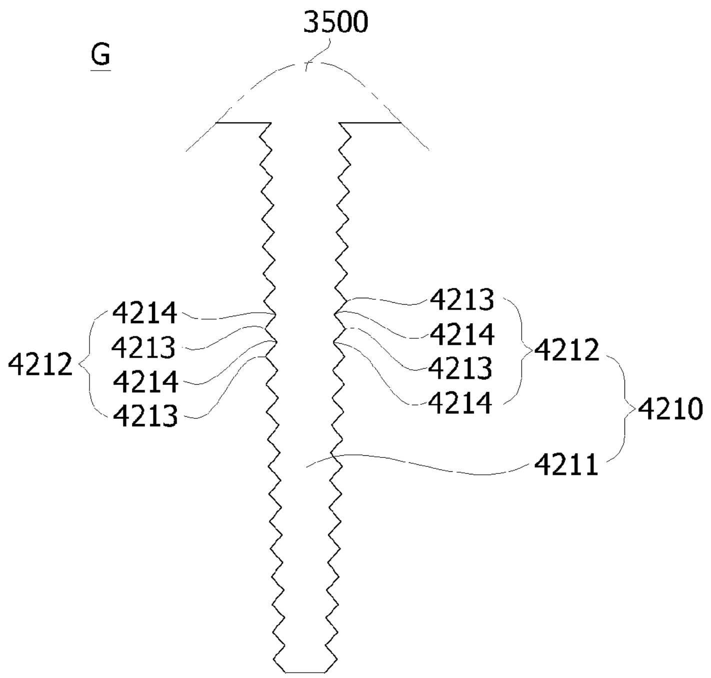

The second heat dissipating fins 4200 having the second heat sink 4210 further include a second pattern piece 4212 having a repeated rib 4213 and groove 4214 on at least one side of the plurality of the protruding second fin body 4211, more particularly, at both sides of the second fin body 4211, to greatly increase the heat transfer area for heat dissipation effect as in FIG. 20 and FIG. 21.

The formed direction of the second pattern piece 4212 may be parallel with the second heat dissipating fin 4210 that is formed along the air moving part (P) to activate natural convection.

Therefore, the present embodiment provides an optical semiconductor based illuminating apparatus that activates the natural convection to increase effect of the heat dissipation.

What is claimed is:

1. An optical semiconductor based illuminating apparatus comprising:

a housing having an opening portion;

a lighting unit disposed adjacent to the housing and comprising at least one optical semiconductor;

a power supply mounted within the housing and configured to supply power to the lighting unit;

a gate unit connected to the opening part, the gate unit comprising:

a base part;

at least one sliding rail part connected to the base part and disposed on the gate unit by slidingly connecting with the housing; and a rail receiving part disposed within the housing accommodating the sliding rail for slidingly connecting with the sliding rail part.

2. An optical semiconductor based illuminating apparatus comprising:

a housing comprising:

at least one semiconductor device, and a rail in a channel that is depressed in the outer surface of the housing; and a tilting unit that is connected to the rail and controls the tilt angle of the housing.

3. The optical semiconductor based illuminating apparatus of claim 2, wherein the tilting unit is slidingly connected with the rail, the tilting unit comprising a head that is connected to an object.

4. The optical semiconductor based illuminating apparatus of claim 2, wherein the tilting unit comprises:

a fixing segment that is fixed to an object; and a bracket that combines with the fixing segment and connects with the housing.

5. The optical semiconductor based illuminating apparatus of claim 3, wherein the tilting unit further comprises a bracket that is connected to the object, in which the bracket is combined with the head to rotate.

6. An optical semiconductor based illuminating apparatus, comprising:

a lighting unit comprising at least one semiconductor device;

a housing, the lighting unit being disposed in the lower portion of the housing;

a heat sink mounted adjacent to the lighting unit and formed inside the housing, the heat sink comprising:

at least one heat dissipating plate that face-to-face connects with at least one inner side of the housing;

a power supply disposed on one portion of the heat dissipating plate; and a power supply that is selectively disposed between the inner side of the housing and the heat sink, or at least on one side of the inner side of the heat sink.

7. The optical semiconductor based illuminating apparatus of claim 6, wherein the power supply is disposed between the inner side of the housing and the outer side of the heat sink, or inside the space that is formed by the inner side of the heat sink.

8. The optical semiconductor based illuminating apparatus of claim 6, wherein a rail in a channel that is depressed in the outer surface of the housing is formed longitudinally.

9. The optical semiconductor based illuminating apparatus of claim 8, wherein the housing comprises:

a first reinforcing projection piece that connects with the heat sink and protrudes from the inner side of the housing having the rail.

10. The optical semiconductor based illuminating apparatus of claim 6, wherein the power supply comprises:

a plurality of auxiliary heat dissipating fins facing inward towards the center of the housing or outward towards the housing; and an auxiliary heat dissipating plate on which the auxiliary heat dissipating fins are formed, wherein the auxiliary heat dissipating plate is slidingly connected with the heat dissipating plate.

11. An optical semiconductor based illuminating apparatus, comprising:

a lighting unit having at least one semiconductor device;

a base forming the lighting unit;

a heat dissipating member disposed on the upper side of the base;

a first heat sink having a first heat dissipating fin formed on the outer surface of the heat dissipating member; and a second heat sink having a plurality of second heat dissipating fins formed on the outer surface of the base, and integral with the base, a distal end of the first heat dissipating fin being disposed on a distal end of one of the plurality of second heat dissipating fins, together forming a substantially continuous channel.

12. The optical semiconductor based illuminating apparatus of claim 11, wherein the first heat sink and the second heat sink are interconnected and form an air moving path.

13. The optical semiconductor based illuminating apparatus of claim 11, wherein the first heat dissipating fin and the one of the plurality of second dissipating fins are both disposed on a virtual first linear line.

14. The optical semiconductor based illuminating apparatus of claim 11, wherein the base further comprises:

a bottom opened reflector that widens along a downward direction of the reflector.

15. The optical semiconductor based illuminating apparatus of claim 11, wherein the first heat dissipating fin comprises:

a plurality of first fin bodies protruding from the heat dissipating member, a first pattern piece having a repeated rib and groove on the outer side of the first fin bodies.

16. The optical semiconductor based illuminating apparatus of claim 13, wherein the second heat dissipating fins comprise:

a plurality of second fin bodies protruding from the base, a second pattern piece having a repeated rib and groove on the outer side of the second fin bodies.

* * * * *